United States Patent [19]

Hallam

[11] Patent Number: 4,476,398

[45] Date of Patent: Oct. 9, 1984

[54] HOME DEMAND CONTROLLER

[76] Inventor: William R. Hallam, R.F.D. #1, Monmouth, Ill. 61462

[21] Appl. No.: 473,432

[22] Filed: Mar. 8, 1983

[51] Int. Cl.³ .............................................. H02J 3/00
[52] U.S. Cl. ..................................... 307/39; 307/126; 307/132 E; 307/140; 361/189; 361/192; 361/194
[58] Field of Search ....................... 307/34, 35, 38, 39, 307/125, 126, 132 E, 140; 361/160, 189, 192, 194

[56] References Cited

U.S. PATENT DOCUMENTS

| | | | |
|---|---|---|---|
| 2,469,645 | 5/1949 | Harper | 307/35 |
| 2,843,759 | 7/1958 | Roots | 307/34 |
| 3,858,110 | 12/1974 | Breitmeier | 307/35 X |
| 4,141,407 | 2/1979 | Briscoe et al. | 307/35 |
| 4,419,589 | 12/1983 | Ross | 307/39 |

Primary Examiner—A. D. Pellinen
Assistant Examiner—Derek Jennings
Attorney, Agent, or Firm—Berman, Aisenberg & Platt

[57] ABSTRACT

A demand controller uses a sensor to detect the operation of an electric load. The sensor operates a relay which supplies power to a magnetic contactor. The magnetic contactor controls power available to a second electric load so that the total amount of power consumed is held below a predetermined maximum. An auxillary switch operates in conjunction with the magnetic contactor to control power available to other loads. A hierarchy is established so that the most important load always has power available, and loads of lesser importance are controlled.

7 Claims, 1 Drawing Figure

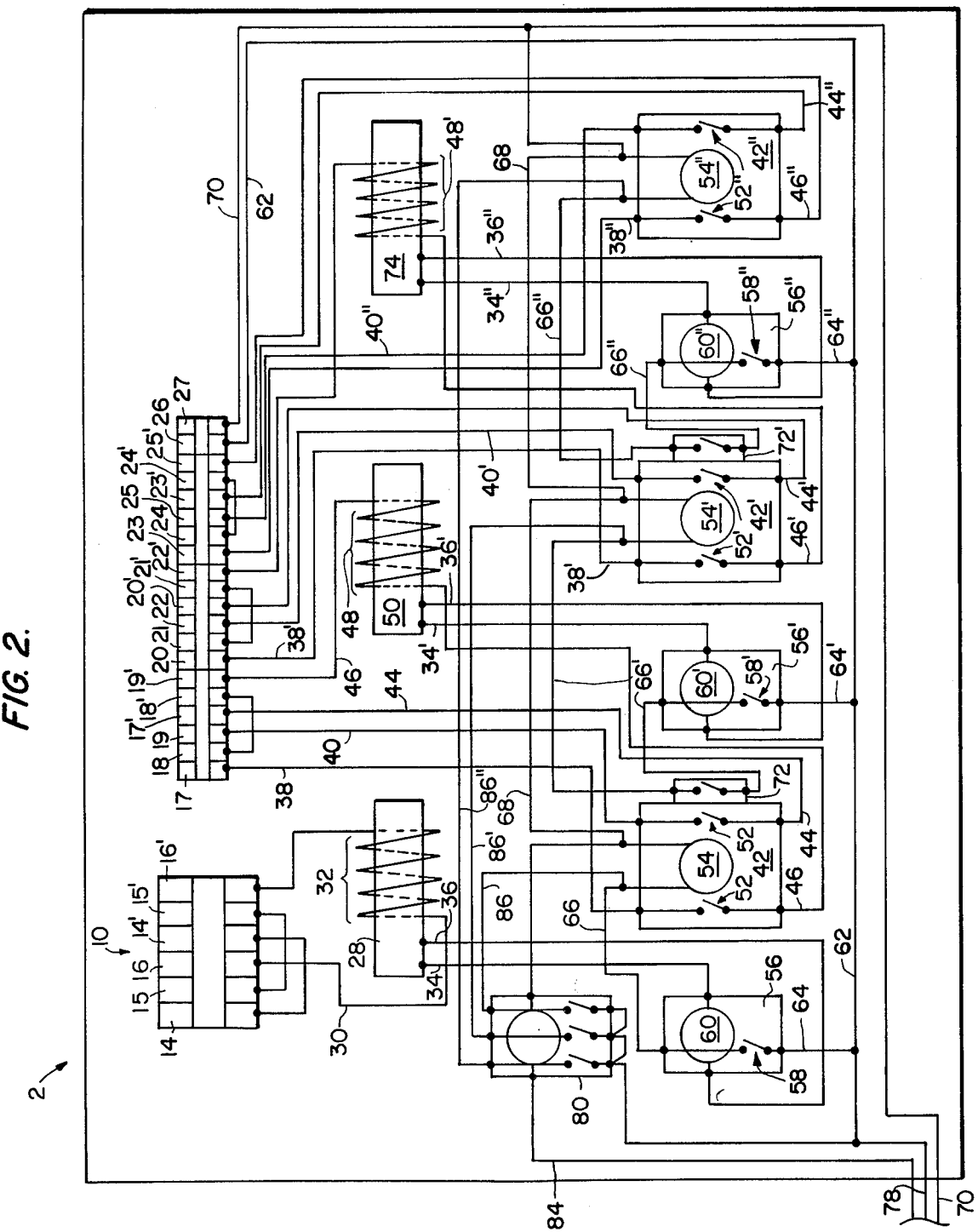
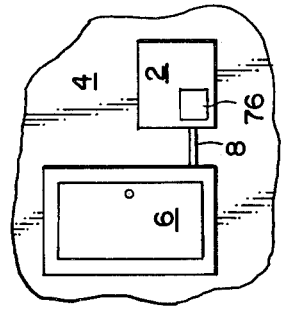
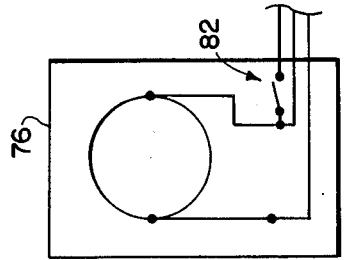

HOME DEMAND CONTROLLER

TECHNICAL FIELD

This invention relates to the art of demand controllers wherein operation of one electrical device limits the power available to another electrical device.

BACKGROUND ART

With the cost of constructing an electric power plant increasing, it has become common to charge a customer for the peak demand required by the customer in addition to charging for the total amount of power consumed. Thus, a customer who allows all of his electrical equipment to operate simultaneously may pay a higher utility bill than the customer who spreads out his usage to operate the equipment at different times.

It has been common to apply demand charges to commercial customers, but is has only recently become common to apply demand charges to residential customers also. This means that the residential consumer who operates the stove, washing machine, clothes dryer and water heater simultaneously may be forced to pay a very high demand charge, while the consumer who is attentive enough to not run these appliances simultaneously will pay a lower demand charge. Of course, both of these customers may pay an equal charge for the power actually consumed.

While it is evident that a consumer may lower his demand charge by being attentive to the appliances in use, such is oftentimes difficult to do. Therefore, automatic demand controllers have been proposed to measure the power consumed by major electrical devices and to limit power available to some of these devices so as to maintain the peak demand below a predetermined level.

One such automatic demand controlling device is disclosed by the U.S. Pat. No. (2,843,759) to Roots. This patent teaches a system primarily designed for an industrial environment, and includes a power sensitive means in series with an electrical device to measure the power consumed by the device. The power sensitive means for one device is connected to a switch in series with a second device to control the power available to the second device. Each switch controls only one load, so that if one load is out of operation, for example because of its being repaired, other loads will not be controlled.

A second demand controller is shown in the U.S. Pat. No. (2,469,645) to Harper. This controller operates by integrating the power consumed by a load and comparing that with the maximum power which may be consumed in a predetermined time interval. When the electrical load device is consuming too much power, the controller will begin to interrupt the power available to that device.

Another controller is shown by the patent to Briscoe, et al. U.S. Pat. No. (4,141,407). This device simply interrupts the power to a group of load devices to ensure that the power consumed by all of the devices is below a predetermined level.

A device taught by Breitmeier U.S. Pat. No. (3,858,110) merely limits the power to a load device, and does not turn off one load device in favor of another.

STATEMENT OF THE INVENTION

The prior art does not provide a demand controller suitable for use by the typical residential customer. Prior devices must be wired into individual circuits, and the operations of the devices are unduly complex. Furthermore, prior devices do not facilitate the use of a time clock to allow the controller to operate only when the peak demand rates are in effect.

Applicant's invention is a demand controller particularly adapted for use by a residential customer. The inventive demand controller is self-contained, and it may be easily installed to cooperate with existing electrical service by any electrician.

Applicant's demand controller utilizes a plurality of current detectors to sense the operation of selected electrical applicances. The applicances are placed in a hierarchy so that when the most important appliance is turned on, the other major appliances are turned off. When an appliance of lesser importance is turned on, appliances below it in the hierarchy are turned off, but appliances which are above it are still available for use. Applicant's controller is preferably arranged so that an electric range is at the top of the hierarchy, followed by the electric dryer, the air conditioner, and the water heater.

According to the preferred embodiment of Applicant's controller, the water heater will be turned off whenever the range, the clothes dryer, or the air conditioner is operating. This has been shown to be effective because the water heater is typically well-insulated and can maintain the temperature of the water over a long period of time without electric power. Operation of the air conditioner will switch off the water heater, but operation of the air conditioner is subject to operation of the range or the clothes dryer. If either of these appliances is in operation, the air conditioner and the hot water heater will both be switched off. Experience has shown that the temperature of the house will not increase dramatically in the period of time taken to dry a load of clothes or to operate the range for an average period. The range draws the most amount of power, and it is at the top of the hierarchy. All other appliances operate subject to the operation of the range.

Applicant's controller employs a series of magnetic contactors to connect the appliances below the appliance at the top of the hierarchy to a source of electrical power. Each of the contactors is controlled by a current relay, and each of the current relays is controlled by one of the current sensors. Thus, when an appliance is operating, a current sensor detects that operation and supplies a voltage to a current relay. The current relays have normally closed contacts so that if no voltage is applied by the current sensor, the current relay supplies power to a magnetic contactor and the appliance controlled by that contactor receives electrical power. When the current sensor detects that an appliance is in operation, the contacts of the respective current relay are opened and the contacts of the magnetic contactor open also because of the absence of activating current from the relay. When the magnetic contactor opens, the appliance controlled by that contactor does not receive electrical power and it thus does not operate. Each magnetic contactor also operates an auxilliary switch placed in series with the current relay which controls the magnetic contactor having a lower position in the hierarchy. This auxilliary switch acts to prevent power from being supplied to the magnetic contactor for the lower appliance, so that when a given magnetic contactor is opened, all lower magnetic contactors are also opened.

A clock is operated from electric power independent of the power applied to the appliances. The clock supplies current to a timing relay during pre-selected periods of the day. When the timing relay is activated, power is supplied to each of the magnetic contactors so that all appliances are operable regardless of the amount of power being consumed.

BRIEF DESCRIPTION OF THE DRAWING

FIG. 1 shows the installation of the main controller with a conventional circuit breaker or fuse panel.

FIG. 2 shows the circuit diagram of the inventive demand controller.

DETAILED DESCRIPTION OF THE INVENTION

FIG. 1 shows the demand controller of the invention 2 installed on a wall 4 adjacent a pre-existing circuit breaker or fuse panel 6. A conduit 8 may be installed to protect the electrical wires which run between the controller 2 and the circuit breaker or fuse panel 6.

FIG. 2 shows the schematic diagram of the demand controller 2. Located at the top of the main controller are a first terminal block 10 and a second terminal block 12. The first terminal block is larger and thus has a capacity for carrying higher current than does the second terminal block 12. These terminal blocks are alternatively of equal size. The upper row of each terminal block receives wires from the circuit breaker or fuse panel 6. In the terminal block 10, terminals 14, 15 and 16 are adapted to receive three wires from a circuit breaker or fuse in the circuit breaker panel supplying 220 volt power, for example, to the range. Three wires connected to terminals 14', 15' and 16' would return to the circuit breaker panel to be connected to the wires supplying the range. Thus, the terminal block 10 is preferably "downstream" of the circuit breaker or fuse supplying, for example, the range and may be connected by a series of six wires communicating with the circuit breaker and fuse panel 6. Terminals on the other side of the terminal block 10 facing terminals 14–16 and 14'–16' are connected to the circuitry of the demand controller.

Terminal block 12 is connected in the same manner as the terminal block 10 and contains terminals 17 through 27 and 17' through 25'. The terminals 17 through 25 and 17' through 25' supply and control three additional appliances while terminals 26 and 27 supply power to the demand controller itself as will be described below.

As may be seen from an inspection of terminal block 10, terminal 15 is connected directly to terminal 15' and this represents the neutral terminal. Terminal 14 is connected directly to terminal 14' and terminal 16 is connected to terminal 16' by way of a current sensor 28. A conductor 30 extends from terminal 16 to current sensor 28 and has a section 32 in which the conductor 30 is coiled around the current sensor 28 and it is then connected to terminal 16'. It will thus be seen that when the appliance draws current from terminals 14', 15' and 16' the current sensor 28 will produce a voltage on conductors 34 and 36, for example, by induction.

Thus, the appliance which is connected to the first terminal block 10 always has electric power available and is not controlled by a switch. This appliance is at the top of the control hierarchy.

The appliance which is connected to the terminals 17, 18, 19 and 17', 18' and 19' will operate only if the appliance connected to terminals 14, 15 and 16 is not operating. The manner in which the operation of one appliance controls the operation of another appliance will now be described.

Terminals 17 and 19 are connected to one side of a magnetic contactor 42 by conductors 38, 40. The other side of the magnetic contactor 42 is connected to terminals 17' and 19' by conductors 44 and 46. Conductor 46 has a coiled section 48 which cooperates with a second current sensor 50 as will be described below. As described above with respect to terminal block 10, the neutral terminals are connected together directly.

Magnetic contactor 42 has interior switches 52 which are activated by coil 54.

Relay 56 is activated by the voltage between conductors 34 and 36 in response to power drawn by the appliance connected to terminal block 10. This relay has an internal switch 58 which is operated by the coil 60. Switch 58 is normally closed and draws power from conductor 62 through a conductor 64. The other side of the relay 56 is connected to one side of the magnetic contactor coil 54 by a conductor 66. The other side of the magnetic contactor coil is connected to terminal 27 by conductor 68 which is connected to conductor 70.

It will thus be seen that the appliance connected to terminals 17 through 19 and 17' through 19' will receive power when the switch 58 in relay 56 is closed, thus supplying power to the magnetic contactor 42 to close the switches 52. Since the switch 58 in relay 56 is normally closed, the magnetic contactor is normally activated. When the current sensor 28 senses current in conductor 30, relay 56 is activated to open switch 58 to thereby open switches 52 in the magnetic contactor 42 to thereby prevent power from being drawn by the appliance connected to terminals 17 through 19 and 17' through 19'.

Subsequent relays operate in a manner described with respect to the first relay and have been given similar reference numerals with one receiving primed reference numerals and another receiving double primed numerals.

Subsequent magnetic contactors also operate in a manner identical to that of magnetic contactor 42 and also have reference numerals having respective primed, and double primed numbers corresponding to those of contactor 42.

Attached to magnetic contactor 42 is an auxilliary contactor 72 having a switch which operates in conjunction with switches 52. Auxilliary contactor 72 is connected to relay 56 by a conductor 66' and is thus in series with that relay. It will thus be seen that when the magnetic contactor 42 is not activated, the auxilliary relay 72 is open, thus preventing current from conductor 62 from reaching magnetic contactor 42'. Magnetic contactor 42' similarly has an auxilliary contactor 72' which is in series with the output from the relay 56".

The appliance which is connected to terminals 20 through 22 and 20' through 22' operates only when magnetic contactor 42' is activated. Conductor 46' has coiled section 48' which interacts with current sensor 74 to control magnetic contactor 42" in the manner described above with respect to control of magnetic contactor 42.

It will be seen that the conductors 46" and 44" connect magnetic contactor 42" directly to output terminals 25' and 23' respectively. There is no need for these conductors to interact with a current sensor because in the embodiment shown in FIG. 2 there is no appliance in the hierarchy below the appliance connected to terminals 23 through 25 and 23' through 25'. If there were other appliances, it is clear that conductor 46" would cooperate with a fourth current sensor in the same manner as described with respect to the other magnetic contactors 42 and 42'.

The operation of the demand control circuit may now be described. Terminals 14 through 16 are preferably reserved for an electric range, terminals 17 through 19 for an electric clothes dryer, terminals 20 through 22 for a central air conditioning unit, and terminals 23 through 25 for an electric water heater. When there is no current being drawn by any of the appliances, switches 58, 58' and 58" in the relays will be in their normally closed positions. Thus, the magnetic contactors 42, 42' and 42" will be activated so that the switches 52, 52' and 52" will be closed. Therefore, all of the appliances will have power available. If the range were to be turned on, the current passing through conductor 30 would produce a voltage at conductors 34 and 36. This voltage would activate relay 56 to open switch 58 to thereby deactive magnetic contactor 42. The auxilliary relay 72 operates in conjunction with the magnetic contactor 42 and its internal switch would thereby be opened thus deactivating magnetic contactor 42' regardless of the condition of relay 56'. When magnetic contactor 42' is deactivated, auxilliary contactor 72' is also deactivated and the magnetic contactor 42" ceases to receive power regardless of the condition of relay 56". It may thus be seen that when the appliance connected to terminals 14 through 16 is drawing current, all of the other appliances are turned off.

In a similar manner, if the appliance connected to terminals 14 through 16 were turned off, but the appliance connected to terminals 17 through 19 were turned on, a current would be produced in conductor 46 and a voltage would be generated at conductors 34' and 36'. The relay 56' would therefore be activated to open switch 58' to deactivate magnetic contactor 42', auxilliary contactor 72' and magnetic contactor 42".

The above operation has been described for the situation where the demand controller is operated during the period of the day when peak demand rates are in effect. The invention also includes a time clock 76 which prevents the demand controller from operating during non-peak periods. The clock 76 is connected to terminal 27 by conductor 70 and is connected to terminal 26 by conductor 78 which is connected to conductor 62. Conductor 78 is also connected to one side of a time clock relay 80. This relay is preferably a triple-pole switch. Time clock 76 closes a switch 82 during certain preselected periods of the day to supply power to time clock relay 80 through conductor 84. The time clock relay is also connected to terminal 27 by conductor 68. When the switch 82 is closed, the switches in the relay 80 close to supply power to each of the magnetic contactors through conductors 86, 86' and 86". By this action, the operation of the relays 56, 56' and 56" is overridden, and each of the magnetic contactors 42, 42' and 42" is activated to supply current to their respective appliances. Thus, during non-peak rate periods, time clock 76 will activate switch 82 to prevent the controller from disconnecting any appliance.

If desired, a thermostat may be used in addition to the time clock. When the outside temperature reaches a pre-determined level, the thermostat would activate relay 80, or a similar relay, to prevent the controller from disconnecting any appliance.

It may thus be seen that an easily connected and effective demand controller has been described. This controller is capable of being attached to an existing household circuit in a simple manner and is constructed of parts which are readily available.

It is claimed:

1. Apparatus for controlling demand for electricity by a plurality of electrical load devices comprising
    detector means for detecting the operation of a first said electrical load device and for generating a first voltage indicating said operation,
    first relay means connected to a source of electrical power for transmitting said power to a first magnetic contactor in the absence of said first voltage, and for not transmitting said power when said first voltage is present,
    first magnetic contactor means adapted to connect a second of said load devices to a source of electrical power in response to an electrical signal from said relay means,
    second relay means for supplying electrical power to said first magnetic contactor when activated, and
    means for supplying a voltage to said second relay means to activate said second relay means to supply electrical power to said first magnetic contactor whereby said second of said load devices receives power independent of the operation of said first of said load devices.

2. Apparatus according to claim 1 wherein said means for supplying voltage to said second relay is clock means which supplies voltage during a preselected time period.

3. Apparatus for controlling demand for electricity by a plurality of electrical load devices comprising
    detector means for detecting the operation of a first said electrical load device and for generating a first voltage indicating said operation,
    first relay means connected to a source of electrical power for transmitting said power to a first magnetic contactor in the absence of said first voltage, and for not transmitting said power when said first voltage is present,
    first magnetic contactor means adapted to connect a second of said load devices to a source of electrical power in response to an electrical signal from said relay means,
    wherein said first magnetic contactor means includes an auxiliary switch which passes current only when said magnetic contactor passes current,
    a second detector means for detecting the operation of said second electric load device,
    a second magnetic contactor for connecting a third electric load device to a source of electric power,
    a second relay means connected to a source of electric power and to said second detector for transmitting electric power to said second magnetic contactor when second electric load is not operating,
    said second relay means being in series with said auxiliary switch whereby said second magnetic contactor is not activated to transmit power to said third load when either of said first or second loads draws electric power.

4. Apparatus for controlling demand for electricity by a plurality of electrical load devices comprising
    detector means for detecting the operation of a first said electrical load device and for generating a first voltage indicating said operation,
    first relay means connected to a source of electrical power for transmitting said power to a first magnetic contactor in the absence of said first voltage, and for not transmitting said power when said first voltage is present, first magnetic contactor means adapted to connect a second of said load devices to a source of electrical power in response to an electrical signal from said relay means, said first magnetic contactor means including an auxiliary switch which passes current only when said magnetic contactor passes current, a second detector means for detecting the operation of said second electric load device, a second magnetic contactor for connecting a third electric load device to a source of electric power, a second relay means connected to a source of electric power and to said second detector for transmitting electric power to said second magnetic contactor when second electric load is not operating, said second relay means being in series with said auxiliary switch whereby said second magnetic contactor is not activated to transmit power to said third load when either of said first or second loads draws electric power, and wherein said first magnetic contactor means forms a first series combination with said second load, and said second magnetic contactor means forms a second series combination with said third load, and wherein said first and second series combinations are in parallel.

5. The controller of claim 4 wherein said first and second relay means form respective series combinations with said first and second series combinations.

6. The controller of claim 5 wherein the electric power for each of said first and second loads is supplied through a fuse or circuit breaker.

7. The controller of claim 6 wherein said detector means is a current sensor.

* * * * *